Nov. 4, 1924.  
E. B. DAVIS  
REBOUND SHOCK ABSORBER  
Filed March 14, 1924
1,513,971
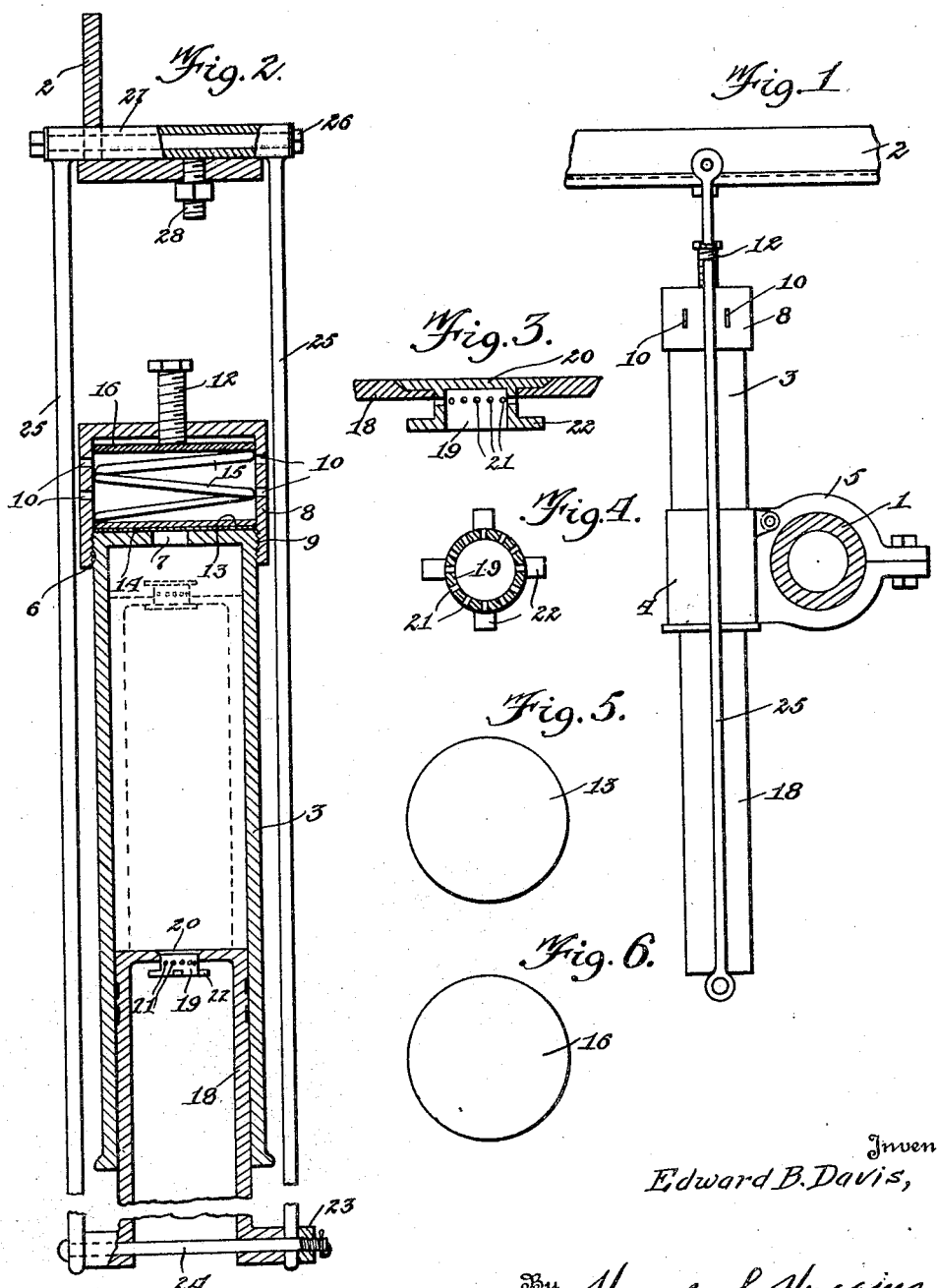
Inventor  
Edward B. Davis,  
By Harold S. Huggins  
Attorney Patented Nov. 4, 1924.

1,513,971

UNITED STATES PATENT OFFICE.

EDWARD B. DAVIS, OF CAMBRIDGE, OHIO.

REBOUND SHOCK ABSORBER.

Application filed March 14, 1924. Serial No. 699,321.

*To all whom it may concern:*

Be it known that I, EDWARD B. DAVIS, citizen of the United States, residing at Cambridge, in the county of Guernsey and State of Ohio, have invented certain new and useful Improvements in Rebound Shock Absorbers, of which the following is a specification.

This invention relates to improvements in shock absorbers adapted for absorbing the rebound of an automobile spring.

The invention is directed particularly to a construction wherein a cylinder is secured in a vertical position to the axle of an automobile and provided with exhaust openings, means for automatically regulating the egress of the compressed air through the openings, the cylinder receiving a piston having a valve in the end portion adapted to permit inlet of air on the outward or downward stroke, the lower end of the piston projecting below the bottom of the cylinder and formed with oppositely extending lateral projections on which are journalled the ends of connecting links pivotally secured to a member carried by the frame.

This invention further provides for an automatic means of absorbing the shock of the automobile in one direction and releasing the shock in another direction. It comprises an automatic valve which will open on the downward movement to allow the air to enter the cylinder and close on the upward movement to check the air and form a compression or rebound absorbing chamber, and a cap consisting of automatic means for governing the egress of the air from the compression chamber through the openings in said cap.

The present invention is an improvement over my copending application filed October 18, 1923, Serial No. 669,351, which clearly discloses the primary object of the present invention.

Other objects and advantages of the present invention will become more apparent as the description proceeds, as clearly set forth in the accompanying drawings and scoped in the appended claims.

Referring more particularly to the drawings, wherein like reference characters indicate like or corresponding parts throughout the several views, Figure 1 is a side elevational view showing the present invention, Figure 2 is an enlarged longitudinal sectional view, Figure 3 is a sectional view of the valve in the piston, Figure 4 is a transverse sectional view of the same, Figure 5 is a plan view of the disk engaging the outer face of the cylinder, and Figure 6 is a plan view of the top disk.

—1— indicates the axle of an automobile supporting the body of the automobile on a frame —2— through the medium of springs, not shown, so that in the use of the automobile the body is resiliently supported by the axle in a well-known manner. It is also well-known that as the automobile rides over irregular surface or drops into ruts in the roadway that the downward movement of the body relative to the axle on the springs is followed by a quick upward movement due to the rebound of the springs into their normal position which, however, causes the body to move past the normal position of the springs in the rebound and occasions considerable jolt to the body and occupants of the automobile.

The present invention is designed to overcome this rebound action and permit the gradual return of the springs to the normal position and includes the cylinder —3— provided with a bracket —4— mounted on the lower end thereof adapted to partially encircle the axle —1— and a member —5— pivoted thereto cooperating with the bracket to secure the cylinder to the rear axle.

The closed end of the cylinder is externally screw threaded as at —6— and provided with an opening —7— to allow for egress of air from the cylinder chamber. Secured to the closed end of the cylinder is a cap —8— internally screw threaded at —9— and provided with port openings or air escapes —10—. The top or closed end of the cap —8— is provided with a screw threaded opening —11— in which is placed an adjustable screw —12—. A solid circular disk —13— in its normal or predetermined position rests against the outer face of the cylinder —3— and has on its cylinder engaging face a leather supporting surfacing disk —14—. A coil spring —15— rests upon the disk —13— and normally retains said disk against the outer face of the cylinder —3—, thereby closing the opening —7—. A circular disk —16— rests upon the coil spring —15— and is provided with a plurality of openings —17— and assists the adjustment screw —12— in regulating the tension of the spring —15—.

A piston —18— is mounted for reciprocating movement in the cylinder —3— and is porvided with a cylindrical valve —19— having a flanged head —20— adapted to seat in the head of the piston and limit the movement of the valve in one direction in which position the openings —21— of the valve are closed to prevent admission of air to the cylinder. The other end of the valve —19— is provided with lateral extensions —22— for limiting upward movement of the valve in the piston head but permitting sufficient movement to allow the openings —21— to admit air to the cylinder. The lower end of the piston projects below the cylinder —3— and is provided with oppositely disposed lateral projections —23— through which extends a bolt —24— on which are journalled the ends of connecting links or hangers —25—, the opposite ends of the links being pivotally mounted on a hanger bolt —26— carried by a bushing —27— having a threaded projection —28— extending through an opening in the frame —2— to which it is secured.

In the downward movement of the frame —2— toward the axle —1—, the piston —18— is moved outwardly and downwardly in the cylinder —3—, during which movement the valve —19— moves upwardly in the piston to permit the intake of air into the cylinder and upon the upward or rebound movement of the frame relative to the axle the valve —19— moves downwardly so that the head —20— seats against the head of the piston, closing the openings —21— whereafter the air in the cylinder is compressed and permitted to slowly exhaust through ports —10— in the cap —8—. On the upward or rebound movement of the frame relative to the axle, the air being compressed in the cylinder and the adjustment screw —12— being properly adjusted, allows the compression of the air to unseat the circular disk —13— against the tension of the spring —15—, thereby admitting the compressed air into the cap —8— and allowing egress through the openings —10—. The screw —12— being properly adjusted regulates the tension of the spring —15— which governs the amount of pressure required to unseat the valve —13— to allow the air to escape through the openings —10—, and which can be readily seen, will prevent the usual quick rebound of the frame and permit it to have a slow gradual return movement to the normal position of the springs. In this way the sudden shocks and jolts occasioned in running an automobile over a rough road are eliminated and the same will have easier riding qualities.

For further advantages obtained from the present invention, attention is directed to my copending application on a rebound shock absorber filed October 18, 1923, Serial No. 669,351, which clearly sets forth the fundamental principle of the present invention.

Having thus described and illustrated the invention in accordance with the patent statutes, it is to be understood that minor changes in the present invention may be made, without departing from the spirit and scope as recited in the herein appended claims.

What is claimed as new is:

1. A rebound shock absorber including a cylinder having means for securing it to the axle of an automobile and having exhaust openings, means to adjustably restrict said exhaust openings, a piston mounted in the cylinder for reciprocating movement, a valve mounted in the piston for admitting air on the outward or downward stroke, and means for connecting the piston with the frame of the automobile for movement therewith.

2. A rebound shock absorber including a cylinder secured to an automobile and having exhaust openings, means to adjustably restrict said exhaust openings, a piston mounted for reciprocating movement in the cylinder, a cylindrical valve member mounted in the piston for admitting air to the cylinder on the outward or downward stroke, and means for connecting the piston with the frame of the automobile for movement therewith.

3. A rebound shock absorber including a cylinder having means for securing it to an automobile and having exhaust openings, means to adjustably restrict said exhaust openings, a piston mounted in the cylinder for reciprocating movement, a valve mounted in the piston for admitting air on the downward or outward stroke, and connecting links pivotally secured to the piston and the frame of the automobile for attaching the piston for movement with said frame.

4. A rebound shock absorber including a cylinder having means for securing it to an automobile and having exhaust openings, means for adjustably restricting said exhaust openings, a piston mounted in the cylinder for reciprocating movement, a valve mounted in the piston for admitting air on the downward or outward stroke, said piston having lateral extensions from opposite sides thereof beyond the cylinder, and a connecting link having one end pivotally mounted on each extension and the other end pivotally connected with the frame to the piston for movement with said frame.

5. A rebound shock absorber including a cylinder disposed in vertical position having the open end at the bottom and removably secured to the axle of an automobile, said cylinder also having exhaust openings, means to adjustably restrict said exhaust openings, a piston mounted in the cylinder for reciprocating movement therein projecting beyond the lower end of the cylinder and having an air inlet valve therein, said piston having a pair of opposite lateral projections on the lower end, and connecting links journalled on said extensions and pivotally connected to the frame of the automobile for attaching the piston for movement therewith.

6. A rebound shock absorber including a cylinder having means for securing it to the axle of an automobile, and having automatic means for regulating the egress of air therefrom, a piston mounted in the cylinder for reciprocating movement, a valve mounted in the piston for admitting air on the downward or outward stroke, and means for connecting the piston with the frame of the automobile for movement therewith.

7. A rebound shock absorber including a cylinder having means for securing it to the axle of an automobile, a piston mounted in the cylinder for reciprocating movement, a valve mounted in the piston for admitting air on the downward or outward stroke, means for connecting the piston with the frame of the automobile for movement therewith, and means secured to the closed end of the cylinder for automatically regulating the egress of air therefrom.

8. A rebound shock absorber including a cylinder having means for securing it to the axle of an automobile, a piston mounted in the cylinder for reciprocating movement, a valve mounted in the piston for admitting air on the downward or outward stroke, means for connecting the piston with the frame of the automobile for movement therewith, and means secured to the closed end of the cylinder for automatically regulating the egress of air therefrom, comprising a cap screw threaded upon the closed end of the cylinder, an adjustment screw in said cap and means cooperating with said adjustment screw for regulating the egress of air from the cylinder.

9. A rebound shock absorber including a cylinder having means for securing it to the axle of an automobile, a piston mounted in the cylinder for reciprocating movement, a valve mounted in the piston for admitting air on the downward or outward stroke, means for connecting the piston with the frame of the automobile for movement therewith, and means secured to the closed end of the cylinder for automatically regulating the egress of air therefrom, comprising a screw threaded cap attached to the closed end of the cylinder, port openings in said cap, an adjustment screw in the top thereof, disks disposed within said cap, and a coil spring interposed between said disks for the purpose described.

10. A rebound shock absorber including a cylinder disposed in vertical position having the open end at the bottom and removably secured to the axle of an automobile, a piston mounted in the cylinder for reciprocating movement therein projecting beyond the lower end of the cylinder and having an air inlet valve therein, said piston having a pair of opposite lateral projections on the lower end, connecting links journalled on said extension and pivotally connected to the frame of the automobile for attaching the piston for movement therewith, an opening in the closed end of the cylinder, a cap mounted on the closed end of said cylinder, port openings in said cap on the sides thereof, disks in said cap, a coil spring interposed between said disks and means for adjusting the tension of said spring whereby the egress of air in the cylinder will be automatically regulated.

In testimony whereof I hereunto affix my signature.

EDWARD B. DAVIS.